(12) United States Patent
Weichholdt

(10) Patent No.: US 7,413,507 B2
(45) Date of Patent: Aug. 19, 2008

(54) GRATE BETWEEN PRECLEANER AND SIEVE

(75) Inventor: Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 24 days.

(21) Appl. No.: 11/449,243

(22) Filed: Jun. 8, 2006

(65) Prior Publication Data

US 2006/0281506 A1 Dec. 14, 2006

(30) Foreign Application Priority Data

Jun. 9, 2005 (DE) .................. 10 2005 026 608

(51) Int. Cl.
*A01F 12/48* (2006.01)
*B07B 1/50* (2006.01)
*B08B 5/00* (2006.01)

(52) U.S. Cl. ..................................... 460/100

(58) Field of Classification Search ................ 460/100, 460/99, 101; 209/676, 352
See application file for complete search history.

(56) References Cited

U.S. PATENT DOCUMENTS

| 3,593,719 | A | * | 7/1971 | Ashton et al. .................. 460/73 |
| 4,307,732 | A | | 12/1981 | De Busscher et al. |
| 4,531,528 | A | * | 7/1985 | Peters et al. ................... 460/97 |
| 5,324,231 | A | * | 6/1994 | Van Herpe et al. .......... 460/106 |
| 5,387,154 | A | * | 2/1995 | Peters ........................ 460/99 |
| 5,489,029 | A | * | 2/1996 | Jonckheere et al. ......... 209/676 |
| 5,624,315 | A | * | 4/1997 | Jonckheere ................... 460/99 |
| 2002/0086722 | A1 | | 7/2002 | Kuhn et al. |
| 2004/0023704 | A1 | | 2/2004 | Grywacheski et al. |
| 2004/0226275 | A1 | * | 11/2004 | Baumgarten et al. .......... 56/153 |
| 2005/0233787 | A1 | * | 10/2005 | Jonckheere et al. ......... 460/109 |

FOREIGN PATENT DOCUMENTS

| DE | 30 42 734 C3 | 9/1997 |
| DE | 101 20 957 C2 | 4/2003 |
| EP | 01 21 094 A1 | 10/1984 |
| EP | 0 701 722 | 5/1994 |
| EP | 0701772 A | 3/1996 |
| FR | 2 611 424 | 9/1988 |

OTHER PUBLICATIONS

German Search Report dated Feb. 12, 2007 (4 pages).
European Search Report, Oct. 4, 2006, 4 Pages.

* cited by examiner

*Primary Examiner*—Árpád F Kovács

(57) ABSTRACT

The subject matter of the present invention relates to a cleaning device for a combine harvester, with a precleaning sieve, to the upper surface of which a mixture of grain and chaff can be fed during the operation, an upper sieve, to which the mixture of grain and chaff rearwardly discharged from the back surface of the precleaning sieve can be fed, a lower sieve, to which the mixture of grain and chaff passing through the precleaning sieve can be fed, and with a fan for applying currents of air to the precleaning sieve, the upper sieve and the lower sieve. On its way between the precleaning sieve and the lower sieve, the mixture of grain and chaff that has passed through the precleaning sieve be passed via a grating which is permeable to air and disposed separately from the lower sieve, to which grating a current of air can be applied by the fan as well.

16 Claims, 3 Drawing Sheets

GRATE BETWEEN PRECLEANER AND SIEVE

FIELD OF THE INVENTION

The subject matter of the present invention relates to a cleaning device for a combine harvester, with a precleaning sieve, to the upper surface of which a mixture of grain and chaff can be fed during the operation, an upper sieve to which the mixture of grain and chaff discharged from the upper surface of the precleaning sieve can be fed, a lower sieve, to which the precleaned mixture of grain and chaff passing through the precleaning sieve can be fed, and with a fan for applying currents of air to the precleaning sieve, the upper sieve and the lower sieve.

BACKGROUND OF THE INVENTION

A combine harvester with a multi-drum threshing system has been described in the German Patent DE 30 42 734 C. The mixture of grain and chaff passing through openings in the threshing concave and the downstream separating baskets is fed via grain pans to a cascade pan to which a rearwardly directed current of air is applied via an upper fan outlet. Disposed below this cascade pan is a precleaning sieve to which a current of air is also applied via the upper fan outlet, and disposed below said precleaning sieve is an additional grain pan. The rearwardly moving mixture on the upper surface of the precleaning sieve falls on an upper sieve, while the precleaned grain and chaff which fall downwardly through the precleaning sieve are transported via the additional grain pan to a lower sieve. A rearwardly directed current of air is applied to the upper and lower sieves by means of a lower fan outlet.

The disadvantage of this design is that the precleaned mixture of grain and chaff which has been passed through the additional grain pan to the lower sieve is compacted to a relatively high degree since it was passed only through the precleaning sieve and was subsequently transported through the additional grain pan. A cascade pan is, in fact, disposed between the additional grain pan and the lower sieve, but only a relatively low current of air is applied to said cascade pan. Thus, compacted material falls onto the lower sieve, which, given a certain sieve opening, limits the potential throughput through the lower sieve and thus through the combine harvester. It is possible to further open the fins of the lower sieve in order to increase the throughput; however, this has a detrimental effect on the cleanness of the ultimately harvested grain.

SUMMARY OF THE INVENTION

The problem to be solved by the present invention is to make available an improved cleaning device which makes it possible to obtain a higher throughput and improved cleanness of the grain in the grain tank.

This problem is solved according to the present invention by the teaching of claim 1, with characteristics that improve the solution in a useful manner being addressed in the other claims.

It is proposed that on its way to the lower sieve, the precleaned mixture of grain and chaff that passes through the precleaning sieve be passed over a grating that is permeable to air and that a rearwardly directed current of air be applied to it. The grating is disposed separately from the lower sieve and defines a horizontally extending conveying track, along which the mixture is transported.

In this manner, the mixture fed from the precleaning sieve to the lower sieve is subjected to an additional precleaning process since the current of air flowing through the grating removes part of the chaff from the mixture that is conveyed above the grating by blowing it away. In addition, the mixture is loosened up and can be more readily separated by the lower sieve. This makes it possible to achieve a higher throughput and/or a higher degree of cleanness of the ultimately harvested grain.

In a preferred embodiment, the fan comprises a first and a second fan outlet. During operation, the second fan outlet supplies the precleaning sieve with a rearwardly and upwardly directed current of air while the first fan outlet applies a rearwardly and upwardly directed current of air to the lower sieve and the grating. Via the grating and/or the lower sieve, the upper sieve is preferably supplied with a current of air which is directed rearwardly and upwardly as well. If a cascade pan which allows a separation of lighter components from the mixture of grain and chaff is disposed downstream of the precleaning sieve in the transition region toward the upper sieve, the first fan outlet can advantageously supply said cascade pan with a current of air by way of the grating as well.

The grating is preferably disposed in the plane of the lower sieve and upstream with respect to the direction of travel. As a result, no additional conveyers are needed to transport the mixture from the grating to the lower sieve.

In a preferred embodiment, the grating comprises a plurality of fins, the longitudinal axis of which runs at right angles to the direction of travel, with the fins being arranged in series one behind the other in the direction of travel. The fins are flat and slope rearwardly and upwardly. All or a part of said fins can be disposed about their longitudinal axis so as to be angularly adjustable, or they can be rigidly mounted. It has also been found useful if the fins disposed in front with respect to the direction of travel (i.e., the distance between the leading and trailing edge of the fins) are shorter than fins disposed further toward the rear.

During operation, the grating is preferably made to vibrate together with the lower sieve. It is, however, also conceivable to connect said grating rigidly to the frame of the combine harvester.

BRIEF DESCRIPTION OF THE DRAWINGS

The drawings show two practical examples of the present invention which will be described in greater detail below. As can be seen.

DESCRIPTION OF THE PREFERRED EMBODIMENT

Figure 1:
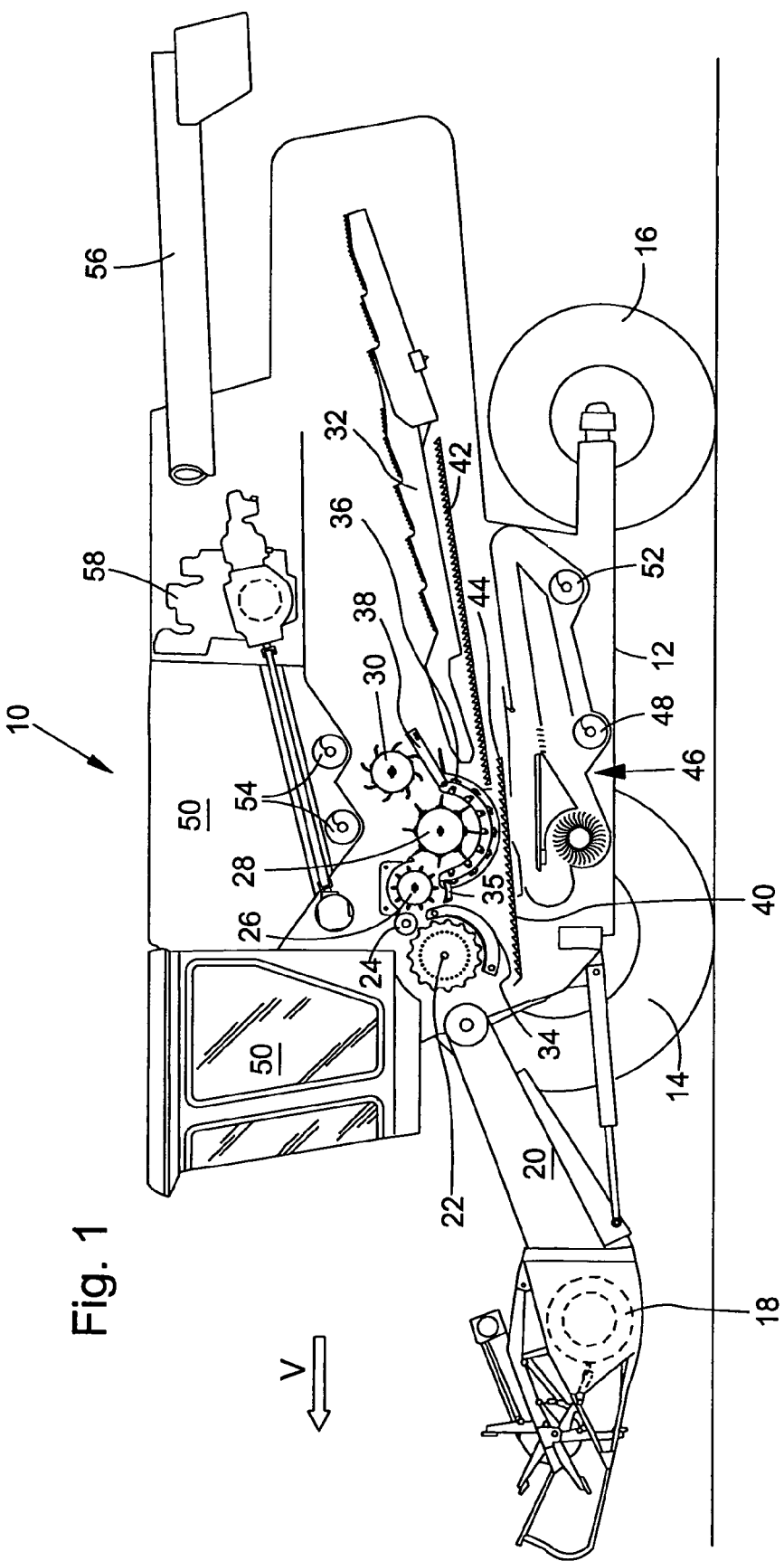
FIG. 1 shows a diagrammatic lateral view of a combine harvester with a cleaning device according to the present invention.

FIG. 1 shows a self-propelling combine harvester 10 with a frame 12 which, by way of driven front wheels 14 and steerable rear wheels 16, supports itself off the ground and is propelled by said wheels. The wheels 14 are made to rotate by means of a driving mechanism not shown in the drawing in order to move the combine harvester 10, e.g., across a field that is to be harvested. Hereinafter, any specifications as to directions, such as front and rear, refer to the direction of travel V of the combine harvester 10 during the harvesting operation.

Removably connected to the front end region of the combine harvester 10 is a harvesting device 18 in the form of a cutting unit so as to be able to harvest crops in the form of cereal or other threshable grain from the field during harvesting operations and to feed it upwardly and rearwardly through an inclined conveyer 20 to a multi-drum threshing system which—arranged in series one behind the other in the direction of travel—comprises a threshing drum 22, a stripper drum 24, an overshot conveyer drum 26, a tangential separator 28, and a turning drum 30. Located downstream of the turning drum 30 is a straw walker 32. The lower and rearward region of the threshing drum 22 is enclosed by a threshing concave 34. Below the conveyer drum 26, a cover 35, either with openings or solid, is disposed, while above the conveyer drum 26, a stationary cover, and below the tangential separator 28, a separating basket 36 with adjustable finger elements is disposed. Disposed below the turning drum 30 is a finger rake 38.

Located below the multi-drum threshing system is a front grain pan 40 which, during operation, executes an alternatingly rearwardly and forwardly directed vibratory movement. A rear grain pan 42 is disposed below the straw walker 32 and, during operation, also executes an alternatingly forwardly and rearwardly directed vibratory movement. The front grain pan 40 transports the mixture of grain and chaff, which passes in a downward direction through the threshing concave 34 and through the tangential separator 36, toward the rear while the rear grain pan 42 transports the mixture of grain and chaff flowing through the straw walker 32 toward the front. At its front end, the rear grain pan 42 transfers the mixture to the front grain pan 40 which subsequently discharges it downwardly through a rear finger rake 44. The mixture discharged from the front grain pan 40 subsequently arrives in a cleaning device 46 which is shown in greater detail in FIG. 2.

The grain which has been cleaned by the cleaning device 46 is fed by means of a grain auger 48 to an elevator not shown in the drawing, which auger transports it into a grain tank 50. A tailing auger 52 returns unthreshed parts of the grain ears via an elevator not shown in the drawing to the threshing process. The chaff can be discharged from the rear end of the sieve device by means of a rotating chaff distributor, or it is discharged through a straw chopper (not shown in the drawing) that is disposed downstream of the straw walker 32. The cleaned grain from the grain tank 50 can be unloaded by means of an unloading system with cross augers 54 and an unloading conveyer 56.

The systems mentioned are driven by an internal combustion engine 58 and can be controlled and steered by an operator from a driver's cab 60. The various means for threshing, conveying, cleaning and separating are disposed inside the frame 12. Disposed outside the frame 12 is an outer cover, most of which can be opened up.

In this context, it should be noted that the multi-drum threshing system shown in the drawing is no more than a practical example. It could also be replaced with a single transversely disposed threshing drum and a downstream separating device with a straw walker or one or a plurality of separator rotors. It is, however, furthermore also conceivable to use a rotating axial separator which comprises a threshing section and a separating section. It is possible to use a single axial separator or two (or more) axial separators that are placed side by side.

Figure 2:
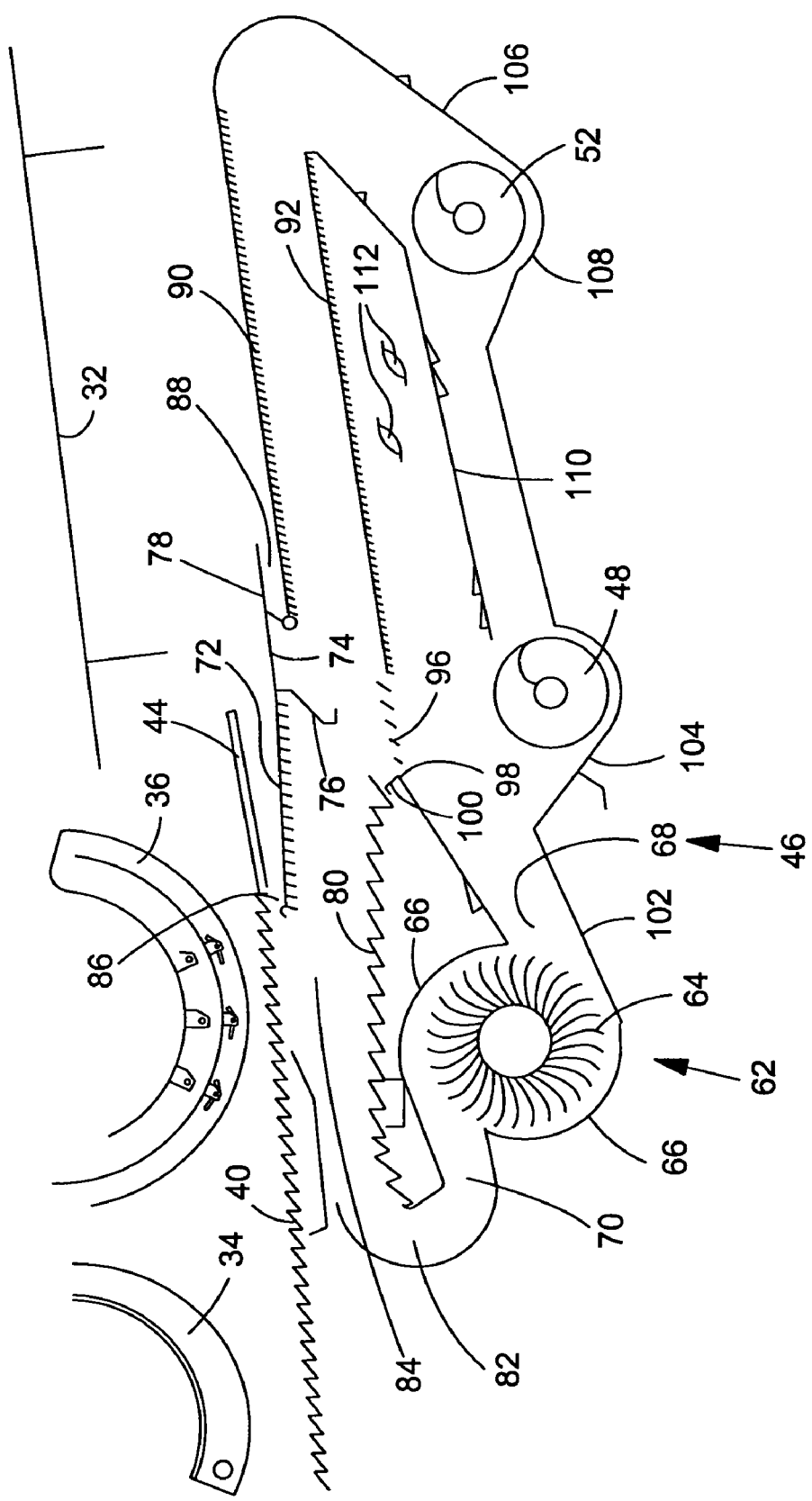
FIG. 2 shows an enlarged diagrammatic lateral view of the cleaning device seen in FIG. 1.

In FIG. 2, the cleaning device 46 is shown in an enlarged lateral view. It includes a fan 62 comprising a rotor 64 which can be made to rotate (in a counterclockwise direction, as shown in FIG. 2) and a housing 66 that encloses the rotor 64. The housing 66 has a first fan outlet 68 and a second fan outlet 70.

In addition, the cleaning device 46 comprises a precleaning sieve 72 with sieve fins that are supported in a sieve frame and mounted so as to be angularly adjustable about their longitudinal axis, which precleaning sieve is disposed below the finger rake 44 and extends approximately from the rearward edge of the front grain pan 40 horizontally toward the rear and slightly upwardly. Connected to the rearward end of the precleaning sieve 72 are a solid plate 74 which extends to form a downwardly inclined guide surface 76 and a finger rake 78 disposed behind the plate 74.

Located below the front half of the precleaning sieve 72 is a grain pan 80, under which the upper portion of the housing 66 of the fan 62 is disposed. The second fan outlet 70 is directed forwardly and guides the air into a rearwardly and upwardly curved channel 82 which guides the air into the gap 84 between the front grain pan 40 and grain pan 80 in which it flows rearwardly. Part of this air reaches a cascade pan 86 which is disposed vertically between the rearward end of the front grain pan 40 and the precleaning sieve 72 and which already partially separates the heavier grain from the lighter chaff which is discharged rearwardly. The remaining portion of the air flowing through gap 84, which air is in part deflected by the guide surface 76, reaches the lower surface of the precleaning sieve 72 and passes through it by flowing rearwardly and upwardly. Grain and to some extent also chaff fall through the sieve fins of the precleaning sieve 72 while the remaining mixture of grain and chaff falls downwardly through the finger rake 78 on the back surface of the precleaning sieve 72.

Via an additional cascade pan 88, the mixture of grain and chaff then reaches an upper sieve 90, below which a lower sieve 92 is disposed. The upper sieve 90 and the lower sieve 92 each comprise sieve fins which are disposed in a frame and which are angularly adjustable independently of one another about their longitudinal axis. Between the front end of the lower sieve 92 and an upper guide plate 94 which is connected to the housing 66 in the area of the first fan outlet 68 and which slopes rearwardly and upwardly, a grating 96 is disposed. Above an edge 98 adjacent to grating 96, the upper guide plate 94 slopes forwardly and upwardly in region 100 and ends in the vicinity of the rearward end of the grain pan 80.

In the embodiment shown, grating 96 comprises five flat fins which are arranged in series one behind the other at right angles to the direction of travel V. The fins are located in rearwardly and upwardly sloping planes. The more forwardly disposed a fin is, the shorter is the length of the fins (viewed in the direction of the current of air). The fins are mounted in a frame (not shown in the drawing) that is connected to the lower sieve 92.

Rearwardly with respect to the first fan outlet 68, the lower portion of the housing 66 of the fan 62 extends rearwardly to form a lower guide plate 102 which, below region 100, extends into a funnel-shaped trough 104 of the grain auger 48. Connected to the rearward end of the upper sieve 90 is a rearward bottom plate 106 which slopes downwardly and forwardly and extends into a funnel-shaped trough 108 of the tailing auger 52. A lower grain pan 110 slopes forwardly and downwardly from the rearward end of the lower sieve 92 above the rearward bottom plate 106 and above the trailing auger 52 and ends above the trough 104 of the grain auger 48. Disposed below the lower sieve 92 are air guiding plates 112.

By means of drives not shown in the drawing, the grain pans 40, 42 and 80 and the precleaning sieve 72 with the guide surface 76 and the finger rake 78, the upper sieve 90, the lower sieve 92 with grating 96, the bottom plate 106 and the lower grain pan 110 and the air guiding plates 112, all of which are mounted via oscillating arms on the frame 12, during operation are propelled mainly in a forward and rearward direction. For this purpose, they are disposed in a sieve pan which vibrates in the directions specified. They all can move in the same direction or, at least in part, in the opposite direction. In this context, reference is made to the disclosure of DE 30 42 734 C which by reference is included in the existing documents. Fan 62 with its housing 66 and the walls of channel 82, the guide plates 94 and 102, the troughs 104 and 108 and the grain auger 48 and the tailing auger 52, however, are rigidly connected to the frame 12. The width of the cleaning device 46 and its components approximately corresponds to at least the width of the multi-drum threshing system and of the straw walkers 32.

When in operation, fan 62 also generates a current of air in the first fan outlet 68, part of which current of air flows rearwardly and upwardly through grating 96. The remaining current of air from the first fan outlet 68, partly guided by the air guiding plates 112, reaches the lower surface of the lower sieve 92 and flows through it. The current of air exiting through grating 96 and through the lower sieve 92 reaches the cascade pan 88 and the lower surface of the upper sieve 90.

As already mentioned earlier, the mixture of grain and chaff, which on the back surface of the precleaning sieve 72 flows through the finger rake 78 or along its upper surface and thus reaches the upper sieve 90, is cleaned in a conventionally known manner by the current of air and the sieve fins of the upper sieve 90. The mixture of grain and chaff passing through the upper sieve 90 reaches the lower sieve 92, while the remaining chaff is transported rearwardly by the current of air and is preferably discharged from the combine harvester 10 by means of the already mentioned chaff distributor or straw chopper. As the mixture of chaff and grain on the lower sieve 92 passes through the lower sieve 92, it is again cleaned in a conventionally known manner, and the grain passing through the sieve fins of the lower sieve 92 flows through the lower grain pan 110 to the grain auger 48 and from there into the grain tank 50. At the rear surface of the lower sieve 92, the tailings are moved by the bottom plate 106 to the tailing auger 52.

Part of the mixture of grain and chaff already mentioned earlier which passes the sieve fins of the precleaning sieve 72 falls directly (i.e., the mixture passing the rearward area of the precleaning sieve 72) and part of it falls via the grain pan 80 (i.e., the mixture passing the front portion of the precleaning sieve 72) above the fan 62 onto the grating 96. The mixture of grain and chaff lying on the grating 96 moves rearwardly along the upper surface of the grating 96 and subsequently reaches the lower sieve 92 on which it is separated into grain and tailings in the manner mentioned earlier. The current of air flowing upwardly and rearwardly through the grating 96 loosens the mixture and entrains lighter particles (chaff) in its stream. Thus, a loosened-up mixture which to a certain extent has been precleaned once more reaches the lower sieve. As a result, the sieving efficiency of the lower sieve 92 is improved, which leads to an increase in the potential throughput of the combine harvester and to an improved cleaning effect.

The grating 96 could also allow a portion of the grain contained in the mixture to pass directly downwardly so that the grain would fall into the funnel-shaped trough 104 of the grain auger 48 and into the extension thereof which slopes upwardly toward the front and would be transported from there directly into the grain tank 50. This portion of the grain thus does not need to be handled by the lower sieve 92.

Figure 3:
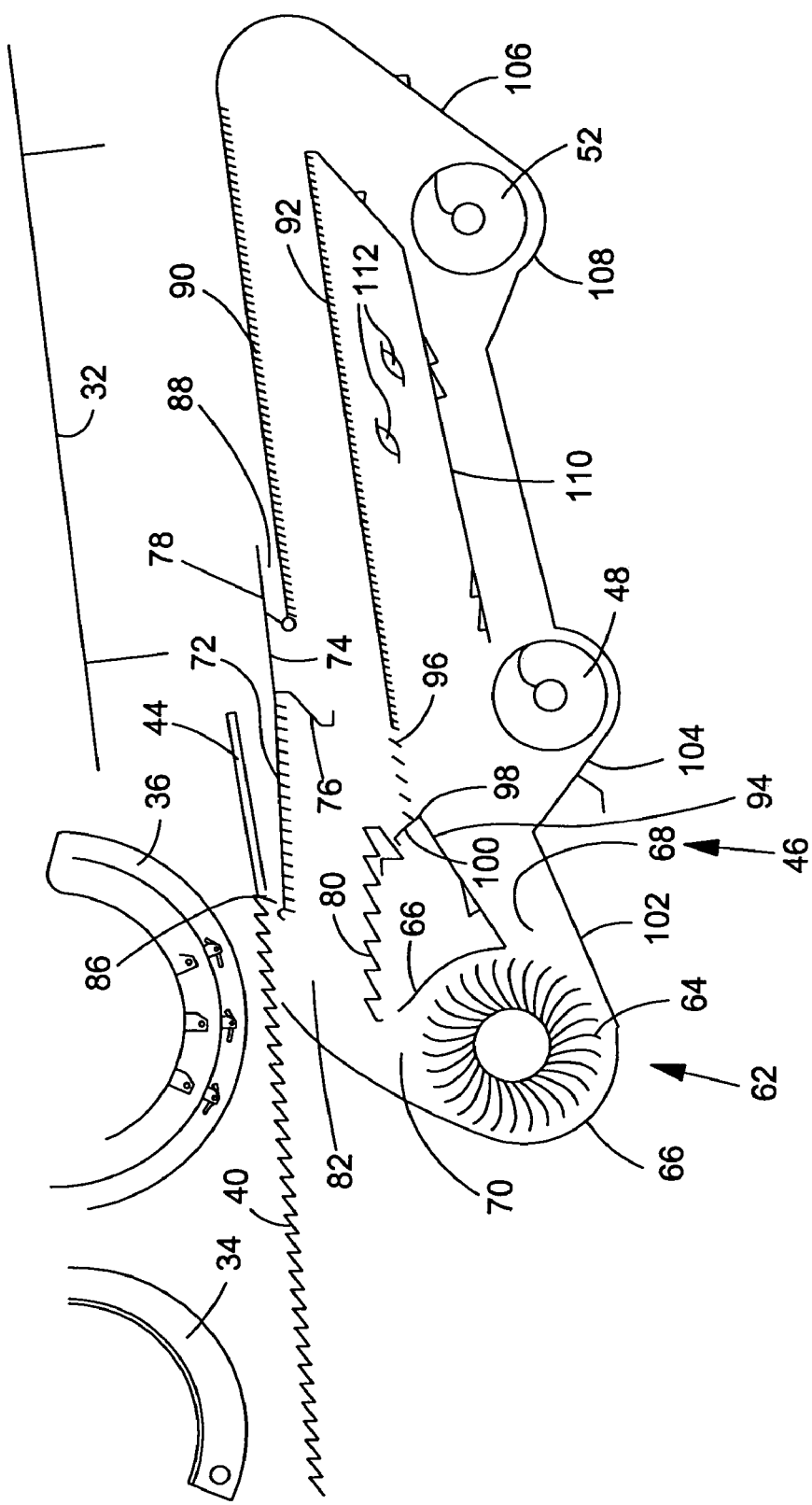
FIG. 3 shows an enlarged diagrammatic lateral view of a second embodiment of a cleaning device.

FIG. 3 shows a lateral view of a second embodiment of a cleaning device 46. Elements corresponding to those of the first embodiment are designated by the same reference characters. The most important difference between it and the first embodiment is that the second fan outlet 70 and the channel 82 disposed downstream of the second fan outlet 70 and leading to the cascade pan 86 and to the precleaning sieve 72 slope directly rearwardly and upwardly. As a result, the grain pan 80 above the housing 66 of fan 62 is therefore shorter, and there is no gap 84 between the front grain pan 40 and grain pan 80 above the housing 66 of fan 62.

Having described the preferred embodiment, it will become apparent that various modifications can be made without departing from the scope of the invention as defined in the accompanying claims.

The invention claimed is:

1. A cleaning device for a combine harvester, with a precleaning sieve, to the upper surface of which a mixture of grain and chaff can be fed during the operation, an upper sieve to which the mixture of grain and chaff discharged from the upper surface of the precleaning sieve can be fed, a lower sieve, to which the mixture of grain and chaff passing through the precleaning sieve can be fed, and with a fan for applying currents of air to the precleaning sieve, the upper sieve and the lower sieve, characterized in that on its way between the precleaning sieve and the lower sieve, the mixture of grain and chaff passing through the precleaning sieve can be moved via a grating which is permeable to air and disposed separately from the lower sieve, to which grating a current of air can also be applied by the fan, wherein the grating is disposed to apply a current of air exiting the grating to a lower surface of the upper sieve.

2. The cleaning device in accordance with claim 1, characterized in that the fan comprises a first fan outlet, through which a current of air can be applied to the lower sieve and to the grating, and a second fan outlet, through which a current of air can be applied to the precleaning sieve.

3. The cleaning device in accordance with claim 2, characterized in that a current of air can be applied by the first fan outlet to the upper sieve via the grating and/or via the lower sieve.

4. The cleaning device in accordance with claim 2, characterized in that a current of air can be applied to a cascade pan between the back surface of the precleaning sieve and the upper sieve by means of the first fan outlet and the grating.

5. The cleaning device in accordance with claim 1, characterized in that the grating is located at least approximately in the plane of the lower sieve and, in the direction of travel, upstream of the lower sieve.

6. The cleaning device in accordance with claim 1, characterized in that the grating comprises flat, rearwardly, and upwardly sloping fins which are rigidly or adjustably mounted.

7. The cleaning device in accordance with claim 6, characterized in that the fins of the grating which, in the direction of travel, are disposed at the front are shorter than the fins which, in the direction of travel, are disposed further toward the rear.

8. The cleaning device in accordance with any one of claims 1-7, characterized in that the grating, in conjunction with the lower sieve, can be moved so as to make it vibrate.

9. A combine harvester, comprising:
 a frame;
 ground engaging wheels mounted on the frame;
 a harvesting device fixed to the frame to cut crop material;
 a threshing system mounted on the frame for receiving crop material from the harvesting device; and a cleaning device for cleaning at least a portion of the crop material, the cleaning device comprising, a precleaning sieve to the upper surface of which the at least a portion of the crop material, including a mixture of grain and chaff, can be fed during the operation, an upper sieve to which the mixture of grain and chaff discharged from the upper surface of the precleaning sieve can be fed, a lower sieve, to which the mixture of grain and chaff passing through the precleaning sieve can be fed, and a fan for applying currents of air to the precleaning sieve, the upper sieve and the lower sieve, wherein on its way between the precleaning sieve and the lower sieve, the mixture of grain and chaff passing through the precleaning sieve can be moved via a grating which is permeable to air and disposed separately from the lower sieve, to which grating a current of air can also be applied by the fan, and wherein the grating is disposed to apply a current of air exiting the grating to a lower surface of the upper sieve.

10. The harvester in accordance with claim 9, characterized in that the fan comprises a first fan outlet, through which a current of air can be applied to the lower sieve and to the grating, and a second fan outlet, through which a current of air can be applied to the precleaning sieve.

11. The harvester in accordance with claim 10, characterized in that a current of air can be applied by the first fan outlet to the upper sieve via the grating and/or via the lower sieve.

12. The harvester in accordance with claim 10, characterized in that a current of air can be applied to a cascade pan between the back surface of the precleaning sieve and the upper sieve by means of the first fan outlet and the grating.

13. The harvester in accordance with claim 9, characterized in that the grating is located at least approximately in the plane of the lower sieve and, in the direction of travel, upstream of the lower sieve.

14. The harvester in accordance with claim 9, characterized in that the grating comprises flat, rearwardly, and upwardly sloping fins which are rigidly or adjustably mounted.

15. The harvester in accordance with claim 14, characterized in that the fins of the grating which, in the direction of travel, are disposed at the front are shorter than the fins which, in the direction of travel, are disposed further toward the rear.

16. The harvester in accordance with claim 9, characterized in that the grating, in conjunction with the lower sieve, can be moved so as to make it vibrate.

* * * * *